Patented Dec. 25, 1923.

1,478,708

UNITED STATES PATENT OFFICE.

KARL W. GASCHE, OF PITTSBURGH, PENNSYLVANIA, ASSIGNOR TO WESTINGHOUSE UNION BATTERY COMPANY, OF SWISSVALE, PENNSYLVANIA, A CORPORATION OF PENNSYLVANIA.

PROCESS OF MANUFACTURING STORAGE BATTERIES.

No Drawing. Application filed July 6, 1920, Serial No. 394,359. Renewed June 26, 1923.

*To all whom it may concern:*

Be it known that I, KARL W. GASCHE, a citizen of the United States, residing at Pittsburgh, in the county of Allegheny and State of Pennsylvania, have invented certain new and useful Improvements in Processes of Manufacturing Storage Batteries, of which the following is a specification.

My invention relates to electrical batteries of the secondary or storage class, and particularly to the process of manufacturing batteries of this class.

One object of my invention is a process of manufacture wherein battery plates are assembled into elements before they have been subjected to the action of electric current, and the complete elements are subsequently developed in containers with one or more elements in each container.

I will describe one process embodying my invention, and will then point out the novel features thereof in claims.

The plate grids are first constructed of lead alloy in the usual manner, or in any special manner which may be desired, and these grids are then filled with any suitable storage battery paste, usually oxides of lead, such as $Pb_3O_4$ and $PbO$, together with the necessary binder and expanders. These plates are then placed in suitable tanks in such a manner as to prevent the plates from rubbing against each other, and the tanks are filled with sulphuric acid having preferably a specific gravity of about 1.275.

After the paste is applied to the grids, the plates may be dried thoroughly, although this is not necessary, but when they are not dried they must be placed in sulphuric acid not less than one hour after the paste is applied to the grids unless means are provided for keeping plates moist.

The pickling of the plates in the sulphuric acid, if carried to completion, converts practically all of the lead oxides into lead sulphates, although it is not necessary to completely convert all oxides into sulphate. This pickling process requires a period of time depending upon the proportions of $Pb_3O_4$ and $PbO$, which are used, and also depending upon the thickness of the plates; the thinner the plates, the shorter the time required, and the thicker the plates, the greater the time required. After the pickling is completed the acid is drawn off and the plates are allowed to dry naturally in the air, or they may be dried by forcing through them air at room temperature or heated air.

After the plates have been pickled and dried, they are burned to connecting straps to form groups of negative and positive plates, and these groups are then assembled into battery elements with a separator between each negative and positive plate. These battery elements are then placed in containers holding one or more elements, and the elements are connected by means of electrical conductors and put on a continuous or intermittent charge at the proper rate, depending upon the area and the thickness of the plates. The charging current converts the lead sulphate to lead peroxide in the positive plate and spongy lead in the negative plate. The charging and forming of the plates is thus accomplished by one step which may be termed "developing" the plates. After this operation is completed the elements are ready to be installed in a battery. The acid is drawn off and the elements are allowed to drain for a short time, whereupon each element is put in its separate receptacle or jar, covers are put on the receptacles, and the cells are assembled in the containing cases in suitable numbers, depending upon the voltage desired.

If the batteries are to be used in a few days or weeks, the cells are filled with sulphuric acid of the proper specific gravity as soon after removing from charging tanks as possible, and are then ready for use.

However, if it is desired to store or ship the batteries in the dry state, no acid is to be added at this time, and the batteries will remain in perfect condition for a considerable period of time, such as from one to two years. The batteries are ready for service after being filled with sulphuric acid of the proper specific gravity and given a freshening charge.

One important feature of my invention is that it consists in assembling unformed plates into battery elements; by unformed plates I mean plates in which the paste has not been converted into lead peroxide and spongy lead by the operation of charging. In my improved process the forming and charging is accomplished in one operation after the plates are assembled into elements.

Another important feature of my invention is that it is unnecessary to handle single plates except for the pasting, pickling and cutting operations. During all the remaining steps of the process the plates are in groups.

Still another important feature of my invention is that there is no loss of energy due to drying of the negative plates. Furthermore the positive plates are not overcharged as is the case in former processes wherein the active material is converted into lead peroxide and spongy lead and then allowed to dry.

The process embodying my invention reduces to a minimum the hazard of lead poisoning, because the dangerous lead oxides are converted into harmless lead sulphate by the pickling step at an early stage in the process of manufacturing the plates.

The process embodying my invention permits of inspection of the finished charged plate, which is not the case in processes wherein the charging operation does not take place until the plates have been put in their ultimate jars or containers.

By my invention the time required for transforming the raw material into the finished product is reduced to about two thirds of the time required with processes heretofore known in the art.

The process embodying my invention eliminates excessive heating because no chemical action takes place when lead sulphate is immersed in sulphuric acid, and because the charging step takes place in open tanks from which heat is rapidly dissipated.

In the processes commonly used, it has been necessary to "dope" the batteries, that is, to adjust the specific gravity of the electrolyte by adding either water or sulphuric acid, after the charging is completed. This procedure is eliminated in the process embodying my invention because the elements are first charged in one container and are then placed in their ultimate jars to which sulphuric acid of the proper gravity is added.

Although I have herein described only one process of manufacturing batteries in accordance with my invention, it is understood that various changes and modifications may be made therein within the scope of the appended claims without departing from the spirit and scope of my invention.

Having thus described my invention, what I claim is:

1. The process of manufacturing a storage battery, which consists in applying a lead oxide paste to the plate grids, pickling the plates in sulphuric acid until the lead oxides are at least partially converted into lead sulphate, assembling said plates into battery elements comprising positive and negative plates, immersing said elements in sulphuric acid, charging the elements until the lead sulphate is converted into peroxide of lead in the positive plates and spongy lead in the negative plates, and then removing the sulphuric acid.

2. The process of manufacturing a storage battery, which consists in applying a lead oxide paste to the plate grids, pickling the plates in sulphuric acid until the lead oxides are at least partially converted into lead sulphate, assembling said plates into battery elements comprising positive and negative plates, immersing said elements in sulphuric acid, charging the elements, and then removing the acid.

3. The process of manufacturing a storage battery which consists in pickling the plates in sulphuric acid, assembling the pickled plates into battery elements, and then charging and forming the elements by one operation.

4. The process of manufacturing a storage battery which consists in pickling the plates in sulphuric acid, assembling the pickled plates into battery elements, developing the plates in sulphuric acid, and then removing the acid and drying the plates for storage or shipment in dry state.

5. The process of manufacturing a storage battery which consists in charging and forming the plates by one operation.

6. The process of manufacturing a storage battery which consists in assembling unformed plates into battery elements and then charging and forming the plates.

In testimony whereof I affix my signature.

KARL W. GASCHE.